July 31, 1934.  H. W. LORMOR  1,968,533
MACHINE FOR REMOVING PASTE FROM GRIDS
Filed Feb. 2, 1929  2 Sheets-Sheet 1
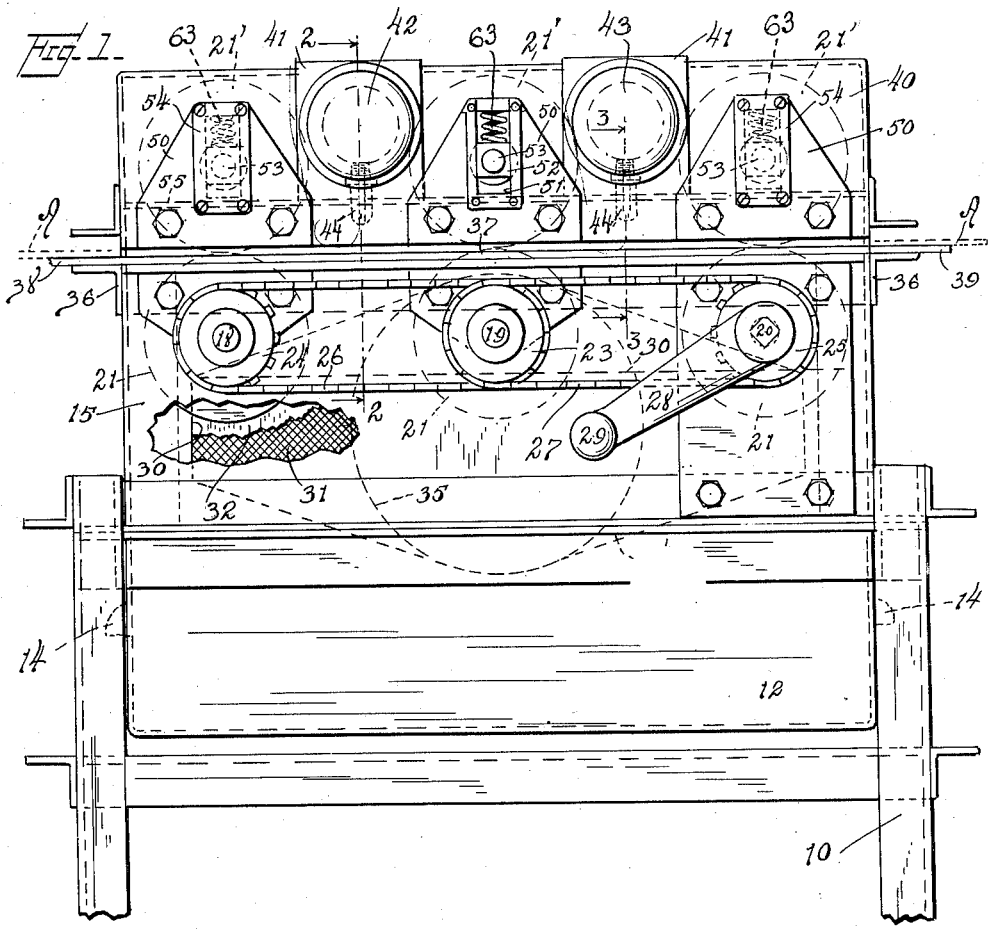
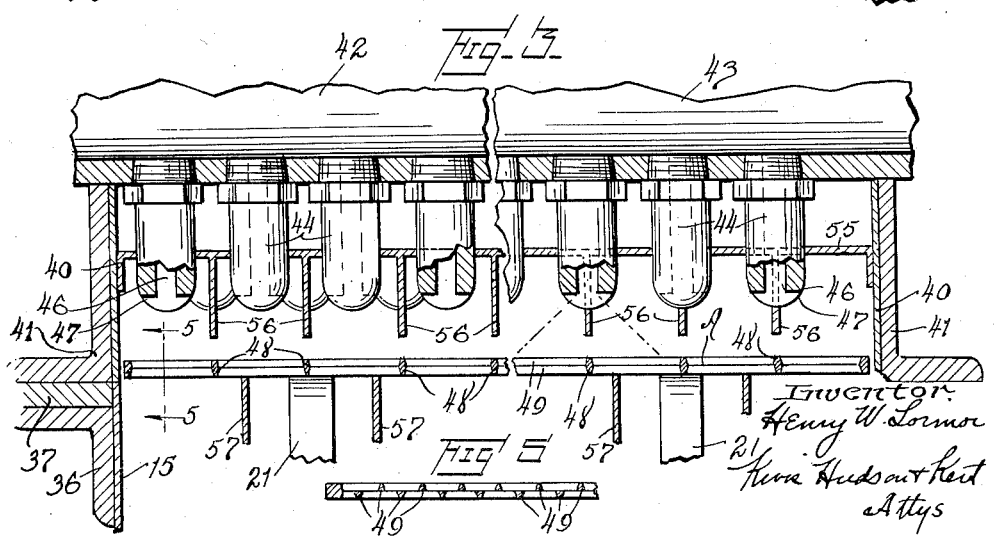

July 31, 1934.  H. W. LORMOR  1,968,533
MACHINE FOR REMOVING PASTE FROM GRIDS
Filed Feb. 2, 1929   2 Sheets-Sheet 2
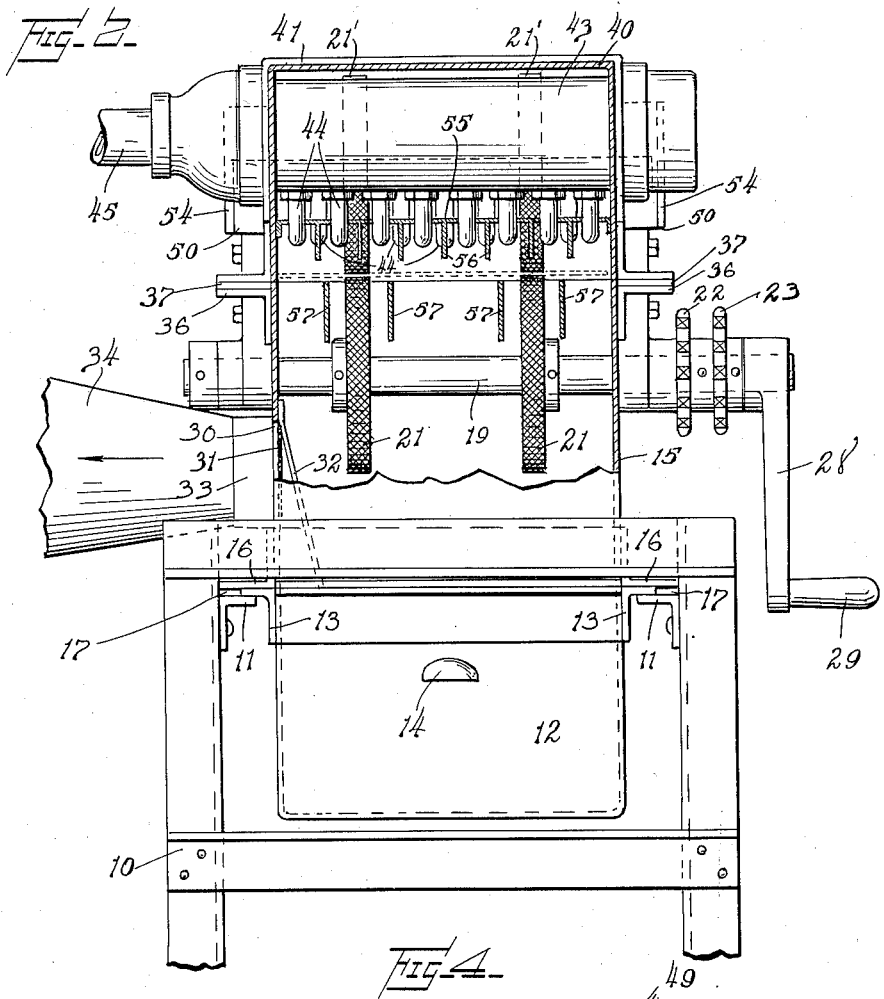
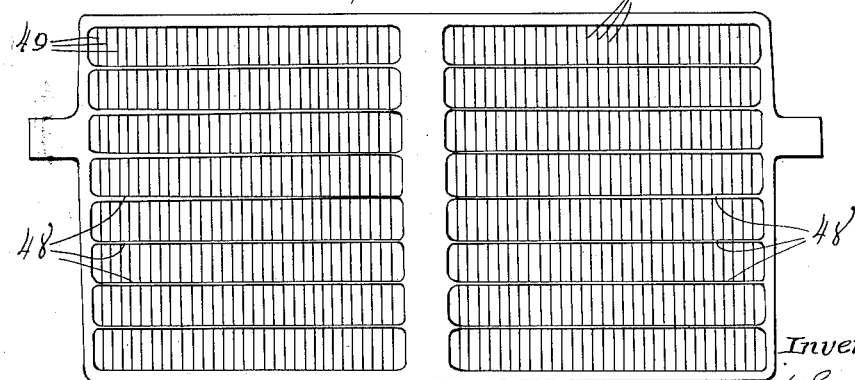

Patented July 31, 1934

1,968,533

UNITED STATES PATENT OFFICE 1,968,533

MACHINE FOR REMOVING PASTE FROM GRIDS

Henry W. Lormor, Cleveland Heights, Ohio, assignor to Willard Storage Battery Company, Cleveland, Ohio, a corporation of West Virginia Application February 2, 1929, Serial No. 337,109

7 Claims. (Cl. 15—20)

This invention relates to improvements in a machine for removing paste from grids. It is intended primarily for use upon storage battery plates within a short time after the pasting of the same, that is before the paste has had time to set. The pasting of the grids is sometimes defective, making it inadvisable to use the plates. In such event, the plate is fed through the present machine and the paste salvaged. The grid skeleton may also be used again unless it is damaged.

One of the objects of the invention is the provision of an apparatus for removing paste from plates involving the subjection of the plate to fluid pressure for forcing the paste out of the interstices of the grid skeleton, the fluid being delivered along a line transverse to the grid, and relative motion being provided between the grid and the fluid jets.

Another object is the provision of a machine or apparatus, in which the plates are supported in a horizontal plane in such manner that no obstruction is offered to the falling paste dislodged from the grid by the fluid jets.

A further object is the provision of a conveyor or carrier which positively engages the grids upon both of their opposite surfaces, and which automatically adjusts itself to grids having variations in thickness, as well as to grids of different thicknesses.

Another object is the provision of means for collecting the paste removed from the grids.

Other objects and features of novelty will appear as I proceed with the description of the embodiment of the invention which, for the purposes of the present application, I have illustrated in the accompanying drawings, in which:

Fig. 1 is a side elevational view, with parts broken away, illustrating a machine constructed in accordance with the invention;

Fig. 2 is an end elevational view, partly in section upon the line 2—2 of Fig. 1;

Fig. 3 is a transverse sectional detail view on a larger scale, one portion of the section being taken on the line 2—2 and the other on the line 3—3 of Fig. 1;

Fig. 4 is a plan view of the skeleton of a "twin" grid; and

Fig. 5 is a cross-section of a grid skeleton taken substantially on the line 5—5 of Fig. 3.

The drawings illustrate a machine which has been constructed and operated and has been found to function satisfactorily for the purposes of the present invention. It is adapted to act upon a "twin" grid, such as is illustrated in Fig. 4, or upon the single grids resulting from sawing in two a "twin" grid. The machine comprises a frame 10 formed preferably of angle bars, adapted to rest upon a floor or other convenient support. The frame 10 is provided with a pair of tracks 11 running longitudinally thereof and consisting preferably of angle bars. An elongated pan 12 is provided with angle bar runners 13 cooperating with the tracks 11 to support the pan for sliding movement so that it may be readily inserted into or withdrawn from the position shown in the drawings. This pan may be provided with a handle 14 on one or both ends for convenience in withdrawing the pan.

Above the frame 10, I mount the body of the machine, consisting of a casing 15 built of sheet metal and angle iron, this casing being open at the top and bottom. It has the same horizontal dimensions as the pan 12 and when the latter is in proper position, the walls of the pan form a continuation of the walls of the casing. The joint between the pan and casing may be made by means of angle bars 16 riveted to the lower end of the casing wall and engaging with the upper flange of the angle bars which form the runners 13 of the pan, the angle bars 16 at the sides of the machine resting upon spacers 17 in order that the weight of the superposed parts shall not be transmitted to the runners. The side walls of the casing 15 are supplied with reinforcements in which are located the bearings for parallel transverse shafts 18, 19 and 20. Each of these shafts has pinned thereto a pair of spaced wheels 21 provided with friction surfaces on their peripheries. These wheels constitute the supports and the conveying means for the grids to be operated upon. The shaft 19 has two sprockets 22 and 23 fixed thereto outside the casing 15. The shaft 18 carries a similar sprocket 24 in alignment with the sprocket 22, and the shaft 20 carries still another sprocket 25 in alignment with the sprocket 23. Chains 26 and 27 operatively connect the sprockets 24, 22 and 23, 25, respectively. One of the shafts 18, 19, 20 may be driven by some suitable manual or power-operated means, and this motion is transmitted to the other two shafts of the group by the sprockets and chains just referred to. In the present instance, I have shown the shaft 20 squared at its outer end for the reception of a hand crank 28, provided with a handle 29.

One side of the casing 15 has an elongated opening 30 therein covered with a screen 31 which may be lead-coated, if desired, in order to protect it against possible acid fumes. A deflector plate 32, of a size at least as large as the opening 30, is attached to the wall of the casing above the opening and extends downwardly and inwardly to direct falling material away from the opening. Around the opening outside the casing there is provided a hood 33, to which may be attached a sheet metal connector 34, in the form of a flattened funnel, that may lead to a round exhaust pipe 35, indicated in dotted lines in Fig. 1.

Around the upper edge of casing 15, there are riveted or welded angle bars 36. Above these bars at the sides of the machine are spacing plates 37, while at the ends of the machine in the same plane with the plates 37 are ledges 38 and 39 upon which the grids rest as they are fed into and emerge from the machine. In Fig. 1, two grids A are shown in dotted lines at the entrance and exhaust ends of the machine.

Above the casing section 15 there is a cover section 40, the side and end walls of these two sections being in alignment and making a reasonably tight joint. A pair of sheet metal strips 41 extend over the top and sides of the cover and have outwardly directed flanges at their lower ends overlying and resting upon the spacing plates 37. Cylindrical headers 42 and 43 of identical form are mounted transversely in the metal strips 41 and side walls of the cover. Each of these headers is provided at one end with an inlet pipe 45, by means of which air or other fluid under pressure may be introduced into the header. At the bottom of each header, preferably in a straight line along the length of the header and within the cover are a series of nozzles 44. These nozzles are preferably threaded into the headers 42 and 43, as shown in Fig. 3. They have a central circular bore 46 terminating short of the lower end of the nozzle, this bore communicating with a saw kerf slot 47 through the extremity of the nozzle, these slots extending in a direction longitudinally of the header and transversely of the machine. On account of the shape of the fluid discharge passage of each nozzle, the stream of fluid leaving the nozzle will take the form of a fan, as indicated in Fig. 3, and these fan-shaped streams will merge into each other whereby, in effect, the grid A will be subjected to a sheet of fluid striking the grid vertically across its entire surface. The greatest force of each stream, however, is in line with the axis of each nozzle. The nozzles of one header 42 are preferably spaced half-way between the heavy vertical ribs 48 of the grid as the latter passes through the machine, while the nozzles of the header 43 are staggered with respect to the nozzles of the header 42, as indicated at the right-hand side of Fig. 3, so that as the grid passes beneath these latter nozzles, the greatest fluid pressure striking the grid is in line with the heavy vertical ribs 48. Both vertical sheets of fluid move steadily, relative to the grid, over and parallel with the lighter transverse ribs 49 and between them, thus reaching every portion of the paste and entirely removing it from the grid skeleton.

Bolted to opposite sides of the cover 40 are three pairs of castings 50, each casting being provided with a vertical slot 51 in which slides a bearing block 52 that is pressed downward resiliently by a coil spring 63. In each pair of blocks 52 there is mounted a shaft 53 carrying two spaced wheels 21' positioned directly above corresponding wheels 21 on the shafs 18, 19 and 20. Each slot 51 is preferably covered by a plate 54 secured to the casting 50 by screws or the like. When grids are fed into the machine and engage the wheels 21 and 21', the wheels 21' rise against the pressure of springs 63 sufficiently to permit the travel of the grids, the wheels 21' acting merely to hold the grids in positive driving relation with the lower wheels 21, all of the latter wheels being positively driven at the same rate of speed.

Across the cover section there is a partition 55 that is provided with openings of such size as to receive the nozzles 44 and the wheels 21'. Underneath the partition 55 there is a series of ribs 56 in the form of elongated vertically arranged plates running the length of the cover section. The nozzles 44 of the header 42 are arranged between the ribs 56, while the nozzles of the header 43 are in alignment with the ribs which are cut away sufficiently to accommodate the nozzles. There are ribs 57 in the body section 15 of the casing also, these latter ribs being four in number and being somewhat larger than the ribs 56. The partition 55 and the ribs 56 and 57 serve to prevent the upward flow of fluid reflected from the grids and to limit cross currents, as well as to assist in directing the primary flow downward. They have value also, of course, as reinforcements of the casing.

Pasted grids which are defective, as for example those which have biscuits out or gouged, are put through my apparatus before the paste has had time to set, in order that the paste thus removed may be again used for the pasting of new grids. In some cases, the grids themselves may be again pasted, that is where none of the skeleton ribs are broken or otherwise materially damaged. Assuming that the crank 28 is rotated clockwise, as viewed in Fig. 1, the grids A are placed upon the ledge 38 and pushed into the machine, one at a time by the operator. As a grid comes into contact with the first superposed pairs of wheels 21 and 21', the wheels 21' rise sufficiently to admit the grid, whereupon the latter is caused to travel to the right because of its contact with the wheels 21 on the shaft 18. As the forward edge of the grid arrives below the nozzles of the header 42, a sheet of fluid extending entirely across the casing impinges upon the grid and forces the soft paste out of the skeleton, and this sheet of fluid sweeps along the grid as the latter advances. The paste thus dislodged falls downwardly between the ribs 57 into the pan 12. The downwardly moving paste and air or other fluid are deflected away from the screen 31 by the deflector plate 32. Hence, to escape through the screen 31 into the exhaust 34, the fluid must make a sharp turn around the lower edge of the deflector plate 32, centrifugal force thus coming into play to separate fine particles of paste from the fluid. As the grid proceeds, it passes between the wheels 21, 21' of the middle set and is thereby fed forward so as to move beneath the jets of fluid from the nozzles in header 43. Any paste still remaining in the grid is here removed and falls into the pan 12 as before. When sufficient paste has accumulated in the pan 12, the operator grasps one of the handles 14, withdraws the pan and empties it into some suitable container. The cleaned grid skeletons emerge from the machine at the right onto the ledge 39.

Having thus described my invention, what I claim is:

1. In a machine for removing paste from storage battery grids, a fluid header, a series of nozzles mounted in said header and provided with fluid exit slots extending lengthwise of the header, means for moving storage battery grids in a plane parallel with the header facing said nozzles and in a direction transverse to the axis of the header, the nozzles being so spaced and the distance from the nozzles to the path of movement of the grids being such that a substantially continuous sheet of fluid plays upon the grid as it is caused to travel opposite the nozzles, and a series of baffles arranged longitudinally of the machine at right angles to said plane of travel of the grids and terminating adjacent thereto.

2. In a machine for removing paste from storage battery grids, two parallel fluid headers, a series of nozzles mounted in each header at longitudinally spaced points thereof, the nozzles of the two headers facing in the same direction and those of one header being staggered with respect to those of the other header, and means for passing grids in a plane parallel to the axes of said headers and in a direction at right angles thereto, whereby jets of fluid from each series of nozzles are caused to impinge upon the grid and remove the paste from the grid skeleton, and a series of baffles arranged at right angles to said plane of travel of said grids, each of said baffles being in line with a nozzle of one header and interposed between two adjacent nozzles of the other header.

3. In a machine for removing paste from grids, a horizontal fluid header, means for delivering gaseous fluid under pressure thereto, a series of nozzles mounted in said header at longitudinally spaced points thereof, and pairs of wheels between which storage battery grids are adapted to be passed beneath said nozzles, said wheels being arranged to engage both sides of the grids at opposite points out of line with said nozzles, whereby paste dislodged from the grids by the fluid jets is free to fall.

4. In a machine for removing paste from grids, a horizontal fluid header, means for delivering fluid under pressure thereto, a series of downwardly directed nozzles mounted in said header at longitudinally spaced points thereof, two transversely spaced pairs of superposed driven wheels adapted to grip the grids between the wheels of the pairs and to feed the grids forward, said pairs being spaced and positioned to engage the grids along reenforcing ribs thereof, said header being spaced longitudinally of the machine away from said wheels, and a receptacle beneath the path of travel of the grids for the reception of paste removed from the grids.

5. In a machine for removing paste from grids, a horizontal fluid header, said header having downwardly directed exits along its lower side, pairs of wheels between which storage battery grids are adapted to be passed beneath said exits, said wheels being arranged to engage both sides of the grids at opposite points out of line with said exits, whereby paste dislodged from the grids by the fluid is free to fall.

6. In a machine for removing paste from grids, a horizontal fluid conductor, means for delivering fluid under pressure thereto, said conductor having downwardly directed exits along its lower side, two transversely spaced pairs of superposed driven wheels adapted to grip the grids between the wheels of the pairs and to feed the grids forward, said pairs being spaced and positioned to engage the grids along reenforcing ribs thereof, said conductor being spaced longitudinally of the machine away from said wheels, and a receptacle beneath the path of travel of the grids for the reception of paste removed from the grids.

7. In a machine for removing paste from grids, a gaseous fluid header extending transversely of the machine, a series of nozzles mounted in said header extending downwardly therefrom, a horizontal guard plate having openings therein through which said nozzles extend, and means for moving storage battery grids in a horizontal plane beneath said nozzles transversely to the direction of said header, said grid moving means comprising a pair of wheels arranged in a vertical plane and spaced to engage the grids on the upper and lower surfaces thereof, said guard plate having an opening therein through which a portion of said upper wheel extends.

HENRY W. LORMOR.